US008689349B2

(12) United States Patent
Sahita et al.

(10) Patent No.: US 8,689,349 B2
(45) Date of Patent: Apr. 1, 2014

(54) INFORMATION FLOW TRACKING AND PROTECTION

(75) Inventors: Ravi Sahita, Beaverton, OR (US); Michael J. Covington, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 12/774,483

(22) Filed: May 5, 2010

(65) Prior Publication Data

US 2011/0277038 A1    Nov. 10, 2011

(51) Int. Cl.
*H04L 29/06* (2006.01)

(52) U.S. Cl.
USPC ........... 726/27; 726/26; 726/28; 726/29; 726/30

(58) Field of Classification Search
USPC ................................ 726/27, 26, 28, 29, 30
See application file for complete search history.

(56) References Cited

U.S. PATENT DOCUMENTS

| 5,761,477 | A * | 6/1998 | Wahbe et al. .......... 718/1 |
| 6,151,618 | A * | 11/2000 | Wahbe et al. .......... 718/1 |
| 7,111,146 | B1 | 9/2006 | Anvin |
| 7,428,626 | B2 * | 9/2008 | Vega .................. 711/203 |
| 7,730,463 | B2 * | 6/2010 | Eichenberger et al. ...... 717/136 |
| 2002/0082824 | A1* | 6/2002 | Neiger et al. .......... 704/2 |
| 2002/0147916 | A1 | 10/2002 | Strongin et al. |
| 2002/0174224 | A1 | 11/2002 | Scheifler et al. |
| 2004/0117407 | A1 | 6/2004 | Kumar et al. |
| 2004/0117593 | A1 | 6/2004 | Uhlig et al. |
| 2005/0039180 | A1* | 2/2005 | Fultheim et al. .......... 718/1 |
| 2005/0246453 | A1* | 11/2005 | Erlingsson et al. .......... 710/1 |
| 2005/0246718 | A1* | 11/2005 | Erlingsson et al. .......... 719/317 |
| 2006/0047959 | A1 | 3/2006 | Morais |

(Continued)

FOREIGN PATENT DOCUMENTS

| CN | 101313309 A | 11/2008 |
| EP | 2385479 A1 | 11/2011 |

(Continued)

OTHER PUBLICATIONS

G. Edward Suh et al.; Secure Program Execution Via Dynamic Information Flow Tracking [online]; Jul. 21, 2003 [retrieved on Jan. 5, 2012]; Massachusetts Institute of Technology Computer Science and Artificial Intelligence Laboratory Technical Report; Retrived from the internet: <URL:http://dspace.mit.edu/bitstream/handle/1721.1/30396/MIT-CSAIL-TR-2003-004.pdf?sequence=2; pp. 1-14.*

(Continued)

*Primary Examiner* — Bradley Holder
(74) *Attorney, Agent, or Firm* — Barnes & Thornburg LLP (57) ABSTRACT

Embodiments of the invention are generally directed to systems, methods, devices, and machine-readable mediums for implementing gesture-based signature authentication. In one embodiment, a method may involve generating a data protection policy from an un-trusted software environment to govern access to protected data stored in memory in the local computer system. Then the method maps the data protection policy to an enforceable system-level data protection policy managed by an Information Flow and Tracking Protection (IFTP) logic. Next, the method flags the first memory page containing the protected data. Finally, the method enforces the generated data protection policy for the first memory page containing the protected data using the IFTP logic and the enforceable system-level data protection policy.

16 Claims, 6 Drawing Sheets

(56) References Cited

U.S. PATENT DOCUMENTS

| | | | |
|---|---|---|---|
| 2006/0143517 A1* | 6/2006 | Douceur et al. | 714/21 |
| 2006/0248200 A1* | 11/2006 | Stanev | 709/227 |
| 2006/0248350 A1* | 11/2006 | Stanev | 713/189 |
| 2006/0259818 A1* | 11/2006 | Howell et al. | 714/21 |
| 2006/0294380 A1 | 12/2006 | Aissi | |
| 2007/0180238 A1 | 8/2007 | Kohlenberg et al. | |
| 2007/0226723 A1* | 9/2007 | Eichenberger et al. | 717/159 |
| 2007/0240141 A1* | 10/2007 | Qin et al. | 717/158 |
| 2008/0117593 A1 | 5/2008 | Andric et al. | |
| 2009/0007100 A1* | 1/2009 | Field et al. | 718/1 |
| 2009/0070571 A1* | 3/2009 | Neely | 713/1 |
| 2009/0094601 A1* | 4/2009 | Vstovskiy et al. | 717/177 |
| 2009/0125722 A1* | 5/2009 | Gomaa et al. | 713/176 |
| 2009/0172644 A1* | 7/2009 | Nagarajan et al. | 717/128 |
| 2009/0193492 A1* | 7/2009 | Banerjee et al. | 726/1 |
| 2009/0204971 A1 | 8/2009 | Kavsan | |
| 2010/0146273 A1* | 6/2010 | Kang et al. | 713/168 |
| 2010/0180240 A1* | 7/2010 | Davis et al. | 716/5 |
| 2011/0156867 A1* | 6/2011 | Carrizo et al. | 340/5.85 |

FOREIGN PATENT DOCUMENTS

| | | |
|---|---|---|
| JP | 2002-505476 A | 2/2002 |
| JP | 2004-530979 A | 10/2004 |
| JP | 2008-546122 A | 12/2008 |

OTHER PUBLICATIONS

European Search Report for European Patent Application No. 11250491.5-2212, Mailed on Aug. 9, 2011, 3 pages.

Sahita et al., "Methods and Systems to Provide Platform Extensions for Trusted Virtual Machines", U.S. Appl. No. 12/554,376, filed Sep. 4, 2009, 28 pages.

Sahita et al., "Executing Trusted Applications with Reduced Trusted Computing Base", U.S. Appl. No. 12/645,900, filed Dec. 23, 2009, 32 pages.

Sahita et al., "Computer System and Method with Anti-Malware", U.S. Appl. No. 12/658,876, filed Feb. 17, 2010, 21 pages.

Office Action for Korean Patent Application No. 10-2011-42304, mailed on Jul. 25, 2012, 3 pages of Korean Office Action and 3 pages of unofficial English translation.

Office Action for European Patent Application No. 11250491.5, mailed on Aug. 30, 2011, 4 pages of office Action.

Office Action for Japnese Patent Application No. 2011-093908, mailed on Jul. 24, 2012, 1 page of Japanese Office Action and 1 page of unofficial English Summary translation.

Decision for Grant in Japanese Patent Application No. 2011-093908, mailed Nov. 20, 2012, 1 page of Japanese Decision for Grant and 1 page of partial, unofficial English translation.

Office Action received for Chinese Patent Application No. 201110168663.0, mailed on Jul. 25, 2013, 11 pages of Office Action including 6 pages of unofficial English translation.

* cited by examiner

INFORMATION FLOW TRACKING AND PROTECTION

TECHNICAL FIELD

Embodiments of the invention are related to the field of tracking information flows and protecting the information in the flows within a system as well as across a network.

BACKGROUND

Typical end-user computing environments, including those in the enterprise, small-and-medium businesses, and in consumer homes, are increasing in size and complexity. Given the increased capabilities of these systems, it is not uncommon for a "standard" commercial off-the-shelf (COTS) computer system to be used in critical infrastructure or as a client that accesses sensitive data.

As operating systems and client applications become more complex, new opportunities are made available for malicious software such as spyware and rootkits to compromise the systems and, in some instances, propagate quickly across the network. It is not surprising that incidents of information theft and misuse are on the rise.

Many of these information thefts result from an operating system that simply cannot be trusted. Malicious code can easily "hook" into the kernel of an operating system, resulting in a highly privileged and mal-intentioned environment that plays host to all applications on the system. As a result malicious attacks are no longer random and are often intended specifically for data theft. Policies that govern access to sensitive information and/or restricted resources are often compromised because they are specified and enforced using the same environment in which the malware lives. Finally, from an operational perspective, there is no visibility into inadvertently leaked confidential data and few tools exist to help administrators enforce security and privacy policies and restrictions on confidential information.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments are generally directed to systems, methods, and apparatuses for tracking and protecting information flows.

Figure 1:
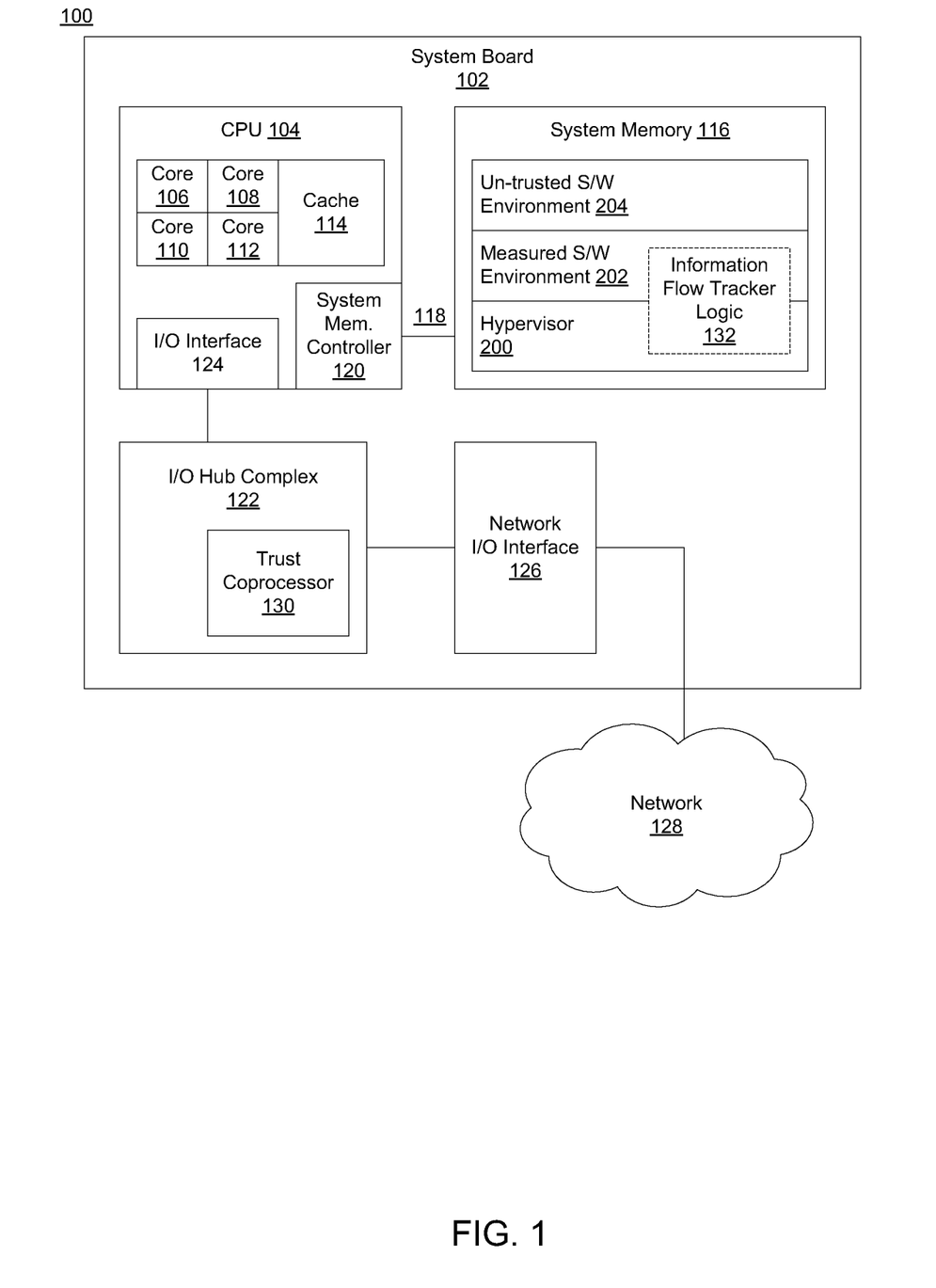
FIG. 1 is a high-level block diagram illustrating selected aspects of an embodiment of a computing system to track and protect information flows.

FIG. 1 is a high-level block diagram illustrating selected aspects of an embodiment of a computing system to track and protect information flows.

Computer system 100 is shown. The computer system may be a desktop, server, workstation, laptop, handheld, television set-top, media center, game console, integrated system (such as in a car), or other type of computer system. In several embodiments the computer system 100 includes a system board 102 (i.e., motherboard) to couple several components together. For example, the system board 102 may be capable of coupling components through the use of wire traces and specific interfaces. The system board 102 may deliver power to the coupled components. Additionally, the system board may provide a communicative interface to allow multiple components to communicate with each other.

Among the components coupled to system board 102 are one or more central processing units (CPUs). Although in many embodiments there are potentially many CPUs, in the embodiment shown in FIG. 1 only one CPU is shown for clarity, CPU 104. CPU 104 may be Intel® Corporation CPU or a CPU of another brand. CPU 104 includes one or more cores. In the embodiment shown, CPU 104 includes four cores: core 106, core 108, core 110, and core 112. In other embodiments, CPU 104 may have a number of cores either greater than or less than the four cores shown in FIG. 1. In many embodiments, each core (such as core 106) includes internal functional blocks such as one or more execution units, retirement units, a set of general purpose and specific registers, etc. If the cores shown in FIG. 1 are multi-threaded or hyper-threaded, then each hardware thread may be considered as a core as well.

CPU 104 may also include one or more caches, such as cache 114. In many embodiments that are not shown, additional caches other than cache 114 are implemented where multiple levels of cache exist between the execution units in each core and memory. In different embodiments the caches may be apportioned in different ways. Cache 114 may be one of many different sizes in different embodiments. For example, cache 114 may be an 8 megabyte (MB) cache, a 16 MB cache, etc. Additionally, in different embodiments the cache may be a direct mapped cache, a fully associative cache, a multi-way set-associative cache, or a cache with another type of mapping. Each cache may include one large portion shared among all cores in the respective CPU or may be divided into several separately functional slices (e.g., one slice for each core). Each cache may also include one portion shared among all cores and several other portions that are separate functional slices per core.

In many embodiments, CPU 104 is communicatively coupled to a system memory 116. System memory 116 may include several memory devices physically connected to the system board 102 or to a substrate as part of an in-line memory module. In many embodiments, the basic structure of a given memory device may be that of a dynamic random access memory (DRAM). In other embodiments, memories such as non-volatile memory or phase-change memory may be used.

The hybrid memory 116 device(s) are communicatively coupled to the CPU 104 through a high speed (HS) input/output link 118 (i.e., interconnect, bus, etc.). In different embodiments, the CPU 104 and system memory 116 may communicate through an interface. For example, a fully-buffered dual-inline-memory-module (DIMM) interface, a scalable memory interface (SMI), a proprietary point-to-point interface, such as the QuickPath technology by Intel®, or another such high speed interface.

In many embodiments, the link 118 may include one or more optical wires, metal wires, or other wires (i.e. lines) that are capable of transporting data, address, control, and/or clock information. In many embodiments, the link is a high speed serial interface that includes multiple lanes, each of which transport data between the CPU 104 and system memory 116.

In many embodiments, CPU 104 includes a memory controller 120 to translate information sent and received across the HS link 118. The memory controller 120 may be coupled to a HS I/O interface (not pictured) that directly accesses the link 118. In other embodiments that are not shown, memory controller 120 may be a discrete device directly coupled to the system board 102 or potentially integrated within another device (e.g., a memory controller hub) that is coupled to the system board 102.

The CPU 104 may be coupled to an input/output (I/O) hub complex 122 through an integrated I/O interface 124. The I/O hub complex 122 provides a communication interface between one or more I/O devices and the CPU 104. For example, the I/O hub complex 122 may be linked to a network I/O interface 126 that couples computer system 100 to an external network 128 (i.e., a network external to computer system 100). Examples of external network 128 may include a home network, a local intranet within a business, a dispersed distributed network across a wide area network topology, or the Internet. The I/O hub complex 122 also may have one or more integrated host controllers to control communication to a given communication protocol link (e.g., a Universal Serial Bus (USB), an IEEE 1394 Firewire, a SCSI (small computer system interface), etc.).

In many embodiments, a trust coprocessor 130 is integrated into the I/O hub complex. In some embodiments, the trust coprocessor 130 comprises a Trusted Platform Module from Intel® Corporation or another type of cryptographic processor designed for hardware-level security enforcement of information protection using cryptographic keys, secure local storage, remote attestation, and other hardware security mechanisms. Although in many embodiments, the trust coprocessor 130 is integrated into the I/O hub complex, in other embodiments that are not shown the trust coprocessor 130 may be integrated into other circuitry in the computer system 100 or implemented as a stand-alone chip.

Additionally, information flow tracking and protection (IFTP) 132 logic, described via a hypervisor 200 and a measured software environment 202, may be implemented as circuitry within the hardware trust coprocessor, in software, in firmware, or in a combination of any of these types of logic in different embodiments. The detailed implementation of IFTP logic is described in FIG. 2.

Figure 2:
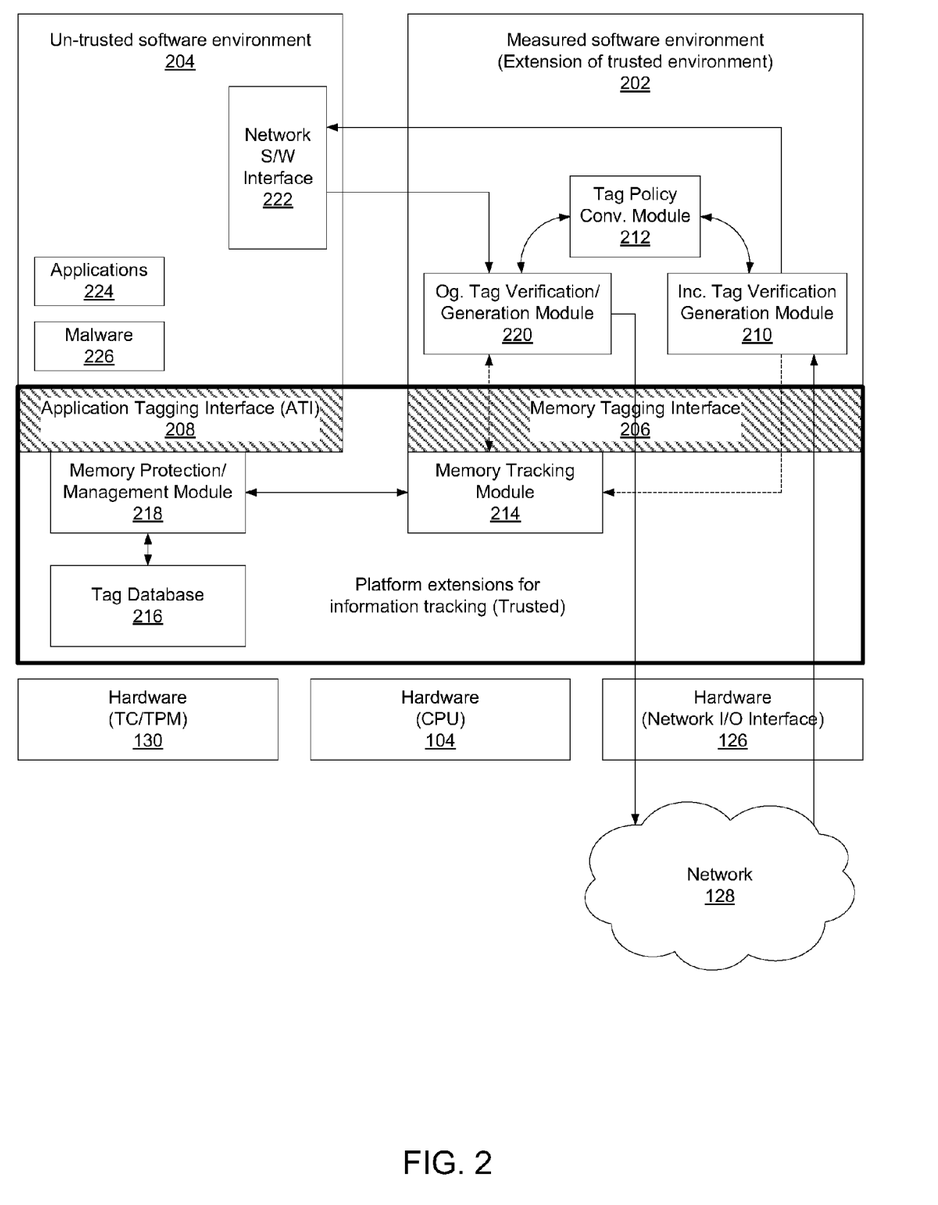
FIG. 2 illustrates an embodiment of specific software, firmware, and hardware components of a computer system utilized to track and protect information flows.

FIG. 2 illustrates an embodiment of specific software, firmware, and hardware components of a computer system utilized to track (i.e. trace) and protect information flows.

The computer system may include certain hardware, such as certain implementations of the hardware discussed in FIG. 1. In many embodiments, the computer system includes a hypervisor. The hypervisor, which may also be referred to as a virtual machine monitor (VMM), allows multiple operating environments to run concurrently on the computer system. Each operating environment (e.g., an operating system (OS)) may be referred to as a guest OS. The hypervisor may grant each guest OS use of certain platform resources. For example, each guest OS may be allocated a certain portion of system memory for use as well as use of other hardware components. In many embodiments, a guest OS is given control of the computer system resources for a slice of time, then another guest OS is given control, and so on in a round-robin or other time-sharing manner. The transfer of control of computer system resources is managed by the hypervisor.

The hypervisor may be implemented in software in many embodiments. The hypervisor runs in a low-level protected mode directly on top of the hardware. For example, the hypervisor works directly with the CPU 104, the trust coprocessor 130, and the network I/O hardware interface 126.

In the embodiment shown in FIG. 2, there are two guest software environments/OSs. In other embodiments that are not shown there may be additional guest software environments. Specifically in FIG. 2, measured software environment 202 and un-trusted software environment 204 are both running in the computer system, potentially sharing time slices of the hardware through a time allocation determined by the hypervisor 200. In many embodiments, although these software environments are running on top of the hypervisor 200, they may not be aware of the hypervisor's existence.

The measured software environment 202 is called as such due to the implemented security measures taken upon start up and potentially at other times during operation. The measured software environment 202 may have its integrity checked upon start up. The actual measurement and attestation of the kernel and other core OS structures may be performed through the use of hardware security protocols implemented in the trusted coprocessor 130 (e.g., using public and private encryption keys through the use of a hash table to verify a current image of the measured environment matches a prior known clean image version. This measurement may not only be performed during computer system start up, but also potentially at set intervals time after the computer system has been running for a certain amount of time since the last measurement. Thus, at any given time, the measured environment is a known safe operating environment without any intrusion by malicious code.

The un-trusted software environment 206 may not be measured or attested at all and rather runs with little or no security measurements. This environment poses a security risk to any software applications running within its environment due to malicious code potentially being capable of comprising information integrity.

These two software environments, measured environment 202 and un-trusted environment 204, run on top of the hypervisor 200 and are in communicative contact with the hypervisor 200. Specifically, there are application interfaces that deal with the communicative handshaking between these two environments and the hypervisor 200. Memory tagging interface 206 allows communicative contact to occur between the measured software environment 202 and the hypervisor 200 and application tagging interface 208 allows communicative contact to occur between the un-trusted software environment 204 and the hypervisor 200. These application interfaces may include a set of calls/instructions (i.e. computer platform extensions, instruction sets, etc.) that the hypervisor 200 and the software environments can utilize.

In many embodiments, when a network packet arrives from the network 128 through the hardware network I/O interface 126, the packet arrives at a incoming tag verification/generation module 210 in the measured software environment 202. The incoming tag module 210 generates information tags that are based on the packet's contents. This module is a specialized packet parser module that can generate unique tags based on matching packet criteria. In many embodiments, the incoming packet includes an amount of data that is being transferred from one computer system to another across the network 128. The incoming tag module 210 can identify the data and parse the data out of the packet for use and to store in the local computer system (i.e., the computer system shown in FIGS. 1 and 2). The incoming tag module 210 also generates the unique tags which are then used locally on the computer system to track the usage of the identified data that was parsed out of the incoming network packet.

In some embodiments, the network packet arrives not only with the data, but also with attached tags to notify the receiving computer system the security to utilize for the data in the packet. For example, one packet may arrive and have no security in place, depending on the level of security required in the local system, this may cause the incoming tag module 210 to generate a generic base level security tag for the data arriving in the packet. On the other hand, another packet may arrive with attached tags that verify the highest security should be used when treating the data in the packet. In this case, the incoming tag module 210 may generate a different set of security tags for the data arriving in the packet. This set of generated security tags may require additional security measures be used for any local entity to be able to access the data or in the extreme, may not allow the local un-trusted software environment 204 to access the data in the packet in any way.

The incoming tag module 210 may pass on the tag information attached to the incoming packet to the tag policy module 212. The tag policy module 212 verifies that the tag policies either received from tags attached to the incoming packet or generated by the incoming tag module 210 are enforced correctly. For example, one policy may decide whether a page of local memory utilized for storage of the incoming data in the packet may be copied or not. In a more restricted tag security setting, the tag policy module 212 may inform the incoming tag module 210 to generate a tag to disallow any copying of a utilized memory page for the data. This generated restriction tag is then sent from the incoming tag module 210 to the memory tracking module 214 in the hypervisor 200.

The memory tracking module 214 provides the memory tracking and enforcement functionality as an extension of the CPU 104 itself. The memory tracking module 214 manages a tag database 216 for physical memory. The tag database 216 is accessed directly by a memory protection/management module 218. In many embodiments, system memory 116 is divided into a number of segments. The system memory 116 being divided allows for separate security protections per segment. In many embodiments, the size of a segment is the size of a physical page of memory (e.g., 4 Kilobytes), in other embodiments, the size of a segment of memory may be smaller or larger than the size of a page of memory. In many embodiments, the tag database 216 may include at least one tag for every segment. In other embodiments, to minimize the size of the tag database, only segments that have protection above the baseline amount of protection include tags detailing that added protection. For other segments that utilize baseline protection, as determined by the tag policy module 212, there may not be a tag and rather just the absence of a tag (e.g., a null pointer).

The variety of levels of memory segment protection may be determined by the tag policy module. For example, in a simple solution, there may be only two levels of protection (e.g., a segment is either protected or it is not protected). In a more complex solution, there may be many levels of protection and the protection level of an individual segment is determined by the sensitivity of the data stored in a given segment. A somewhat more complex solution would be to have three levels of protection: level 0 being read/write access to a segment, level 1 being read access only to a segment, level 2 being no access to a segment. An even more complex protection solution would be to have these three access possibilities for each segment, but have several user access rights levels that may or may not correspond to the access possibilities. For example, unknown users, signed in users, signed in administrators, etc. may be some of the possibilities of user levels. Unknown users may have no access to any segment, signed in users may have read/write access to certain segments and only read access to other segments, whereas signed in administrators may have full access to all segments.

In different embodiments, the incoming tag module 210 may receive a packet without a tag, a packet with a tag specific to the sending system, or a packet with a global tag. The tag specific to the sending system is a tag that relates to a local protection policy generated by a remote computer system. The remote computer system may have sent local tag information along with the packet containing the data to be protected. Although this type of a tag may be beneficial to other systems, because it was generated using a local protection policy, this policy may not be the same type of policy utilized by other computer systems. In some embodiments, the incoming tag module 210 and tag policy module 212 may be able to interpret the remote policies of this type of tag and generate a local tag that mirrors the remote tag. The ability for the transformation of this type of tag from a remote environment to the local environment may be a function of how closely the remote tag system resembles the local system. This type of an interpretation policy may lead to different levels of protection among computer systems. On the other hand, a packet received with a global tag utilizes a tag policy that has been standardized among several computer systems. All computer systems complying with the global tag protection policy will be able to directly import the tag from the network packet and utilize the protection policy transferred between systems within the tag attached to the network packet. A standardized data protection policy assures full protection of the data among all participating computer systems that transfer tag information between each other.

The incoming tag module 210 processes incoming packets by parsing out the tags in the packets. Then it registers those tags with the memory tracking module 214. The registration process associates the tag with one or more memory segments storing the data received from the network packet. The memory tracking module 214 informs a memory protection/management module 216 to update the tag database 216. This update may consist of tag security information for the particular locations in the tag database that are associated with the memory segments storing the newly arrived data. For example, a highly protected piece of data may have arrived in a network packet. This network packet may have included a tag that states that un-trusted environments in the local computer system have no access rights to the data. The data is then stored in system memory in segment 245. The tag database is then updated at location 245 that raises the security level of the associated segment so that no un-trusted environment may gain access to this segment. Thus, subsequently, if a user of an operating system in the un-trusted environment attempts access, the access attempt is processed by the memory protection/management module 218, which then checks the tag database 216 for that segment. Knowing the security level of the user and the higher security level of the memory segment, the memory protection/management module 218 realizes the user does not have a high enough security clearance to access that segment and denies that request.

An outgoing tag verification/generation module 220 is utilized for tag information related to outbound packets. The outgoing tag module 220 may map a tag to a security association with another computer system or another virtual machine. In other words, if the outgoing tag module 220 is aware of the destination system's security associations, it may modify a tag to become compatible with the remote system. The outgoing tag module 220 may also un-tag a currently tagged packet (e.g., if the packet is outbound to a remote network or system that does not utilize security tags). Additionally, if the target destination system does utilize the same data security policies, the outgoing tag module 220 may embed a tag in an outbound packet so the information may be tracked on the compatible remote system. In different embodiments, the target system of an outbound packet may be a remote system or another virtual machine in the local system.

From an inbound point of view, a packet may arrive from network 128 through network I/O interface 126. The packet is received by the incoming tag module 210, which parses the packet, separating the data in the packet from the tag information (if any exists). If the tag does not exist, the incoming tag module 210 may create a tag for the data after consulting with the tag policy module 212 for the correct security parameters that should be utilized. The tag is then sent from the incoming tag module 210 to the memory tracking module 214, which communicates with the memory protection/management module 218 to access the tag database 216. The incoming tag module 210 sends the data from the packet to the un-trusted software environment 204. A network interface 222 running in software in the un-trusted environment receives the data, which may then be used by applications 224 running in the un-trusted environment. Unfortunately, because this environment is un-trusted, other malicious programs may also be running in the un-trusted environment, such as malware 226. Due to the unknown nature of the software in the un-trusted environment, access to the data by any of this particular software may be limited. The level of access given to any entity residing in the un-trusted environment is determined by the security policy detailed in the tag information relevant to the one or more memory segments storing the received data.

From an outbound point of view, an application 224 in the un-trusted software environment 204 attempts to send data in a network packet to an external entity (e.g., another computer system on network 128). The un-trusted environment takes data that is stored in system memory and utilizes the network software interface 222 to send this packet of data. The packet is constructed and sent supposedly to the network, but prior to reaching the network it is intercepted by the outgoing tag module 220. The outgoing tag module 220 checks with memory tracking module 214 regarding the security level of the data in the packet. To do this outgoing tag module 220 sends a query to memory tracking module for the data in the packet. Memory tracking module 214 then looks up the tag information for the data in the tag database 216 utilizing memory protection/management module 218 to do this. The tag information is retrieved and returned to outgoing tag module 220, which then may consult with tag policy module to determine the policy to take for data of the security level described with the retrieved tag information. The outgoing tag module 220 and tag policy module 212 verify whether the data is allowed to be sent to the remote computer system in the first place.

If the data is not allowed to be sent, the network packet is blocked and the attempt is thwarted. If the data is allowed to be sent, then the next determination is made as to whether to attach tag information to the packet. In some embodiments, the remote computer system that is the target of the packet has a compatible data tagging system and the actual tag(s) stored in the tag database may be attached to the packet and sent. In many embodiments, the tag policy module may store or have access to a database of known remote computing systems that have the same tag-based data tracking system. In other embodiments, the remote computer system is not compatible with the same tag-based data tracking system but alternatively utilizes another tag-based system the tag policy module is compatible with. In this case, the tag policy module 212 informs the outgoing tag module 220 of the tag conversion information and the native tag is replaced by a tag compatible with the remote system. In yet other embodiments, the remote computer system is of unknown origin and all tag information is stripped from the data packet prior to allowing it to be sent across the network. In any case, when this process is finished, the outgoing tag module 220 then sends the packet to the remote system across the network 128.

In many embodiments, an application running in the un-trusted environment may actual create data and also indicate the security level associated with the data. In an extreme scenario, the un-trusted software application may specify a security level higher than the access privileges of itself. Thus, after the data is created and stored in system memory, the un-trusted software application may indicate to the measured environment that it no longer has access to the data it has created.

Figure 6:
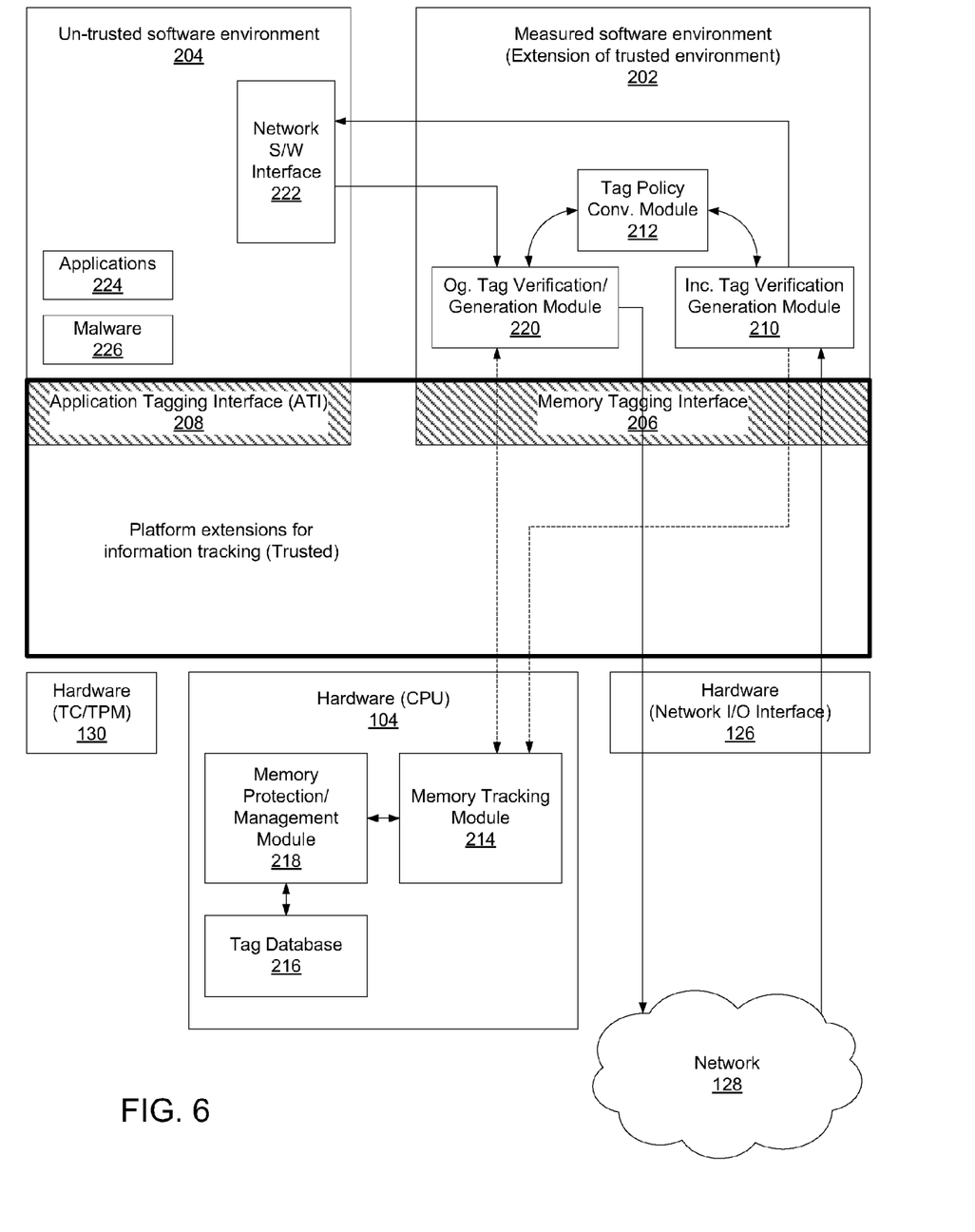
FIG. 6 illustrates an embodiment of information flow tracking and protection logic implemented within hardware of a central processing unit.

Although FIG. 2 describes the IFTP logic in detail as a part of the local hypervisor, the IFTP logic may be implemented in many different locations in different embodiments, as already described. One such alternate embodiment is shown in FIG. 6, which illustrates elements of the IFTP logic being implemented in the CPU.

Figure 3:
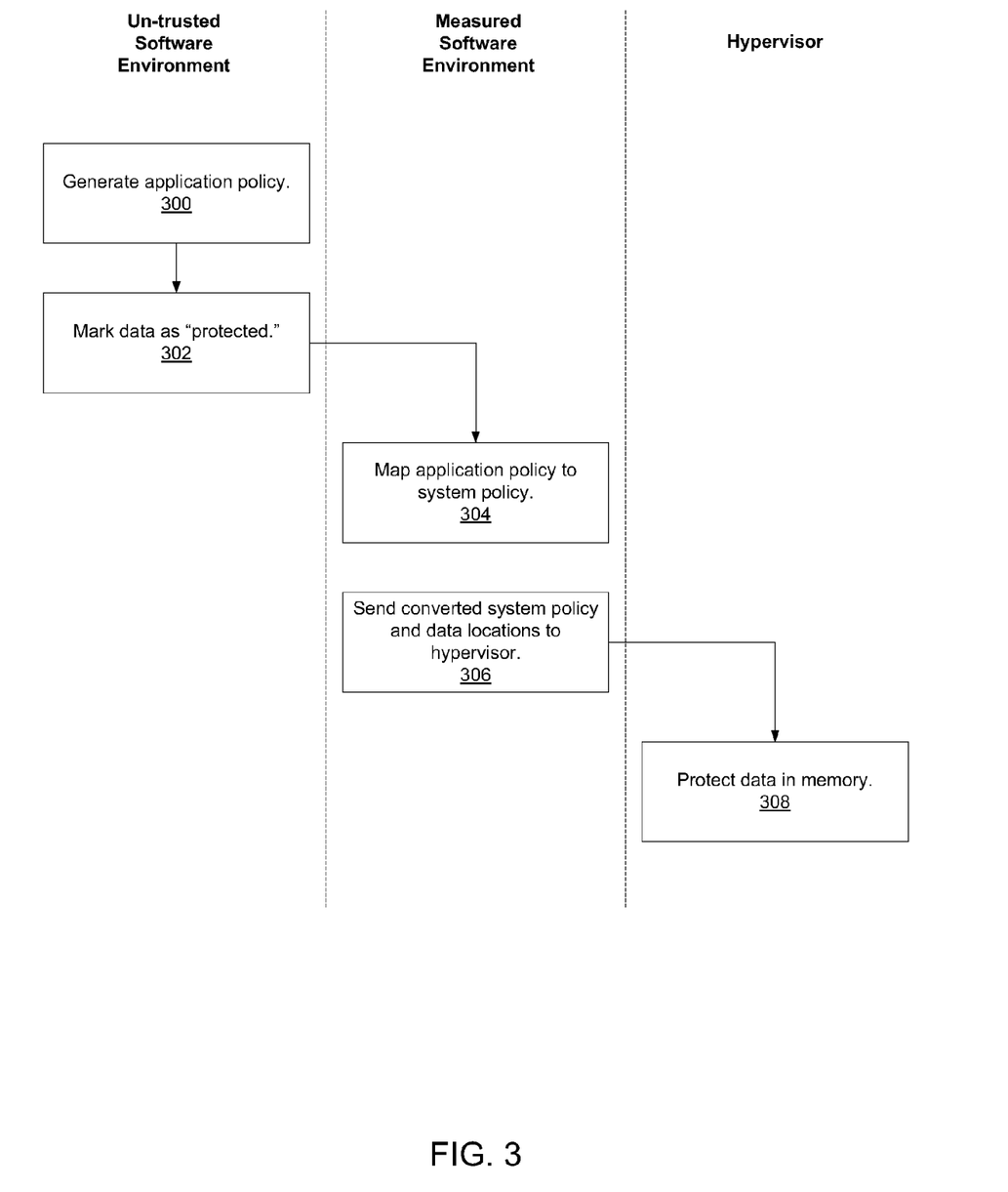
FIG. 3 is a flow diagram of an embodiment of a process to specify and map data protection policies.

FIG. 3 is a flow diagram of an embodiment of a process to specify and map data protection policies.

The flow diagram describes the actions by each of a set of entities interacting in the computer system. As shown, the entities described in FIG. 3 reside either in measured software (e.g., privileged mode software) or un-trusted software. The process begins by a data source (e.g., a software application 224 running in an un-trusted software environment 204) generating an application policy for protecting the data it produces (processing block 300). This application-specific data protection policy is communicated to the tag policy conversion module (212 in FIG. 2) running in a measured software environment. Additionally, the data source also provides a request for data protection and the location of the data to be marked protected (processing block 302). In other words, the data source does not have control over the tag database to dictate the protection scheme, but can request the logic in privileged mode (i.e., the hypervisor) to manipulate the tag database to assign security tags to the data produced by the data source.

The tag policy conversion module then reads the application-specific policy and maps it to an enforceable system level policy (processing block 304), which is then sent to the memory tracking module (214 in FIG. 2) for enforcement (processing block 306). For example, the application-specific policy may request the highest level of security for the data, but when mapping to an enforceable system level policy, the tag policy module may utilize the highest level of security for un-trusted software produced data. This may not be as high as the highest system level policy, which may reserve higher security levels for data produced by a measured environment. The generated system-level policy may be sealed to local hardware by a trust coprocessor 130 interface. This will allow verification of the policy by remote computer systems, should there be any necessity to attest to local policies. A remote computer system may request access to this protected data and a way in which to verify the security of the data would be for the remote system to verify through the use of trust coprocessor hardware security measures, that the remote system is actually enforcing the same levels of data protection (through remote attestation of the security policy).

Once the memory tracking module (214 in FIG. 2) receives the system policy and the location of the data, it sends instructions to the memory protection/management module (218 in FIG. 2) to actually enforce the protection scheme in memory (processing block 308). The protection scheme, as discussed above, utilizes a tag database to tag segments of memory storing the data. The tag is attached to the data and provides a level of access rights security for the data in memory. For example, when an entity attempts to access the data, the entity's relative access level is checked against the tags for the segments of memory storing the data. If the entity has the minimum required security access level, the data is accessible to the entity. Though, in more detailed schemes, access rights may include multiple levels of data access (from a low level access of being able to read the data, to high level access rights of being able to erase the data entirely).

Figure 4:
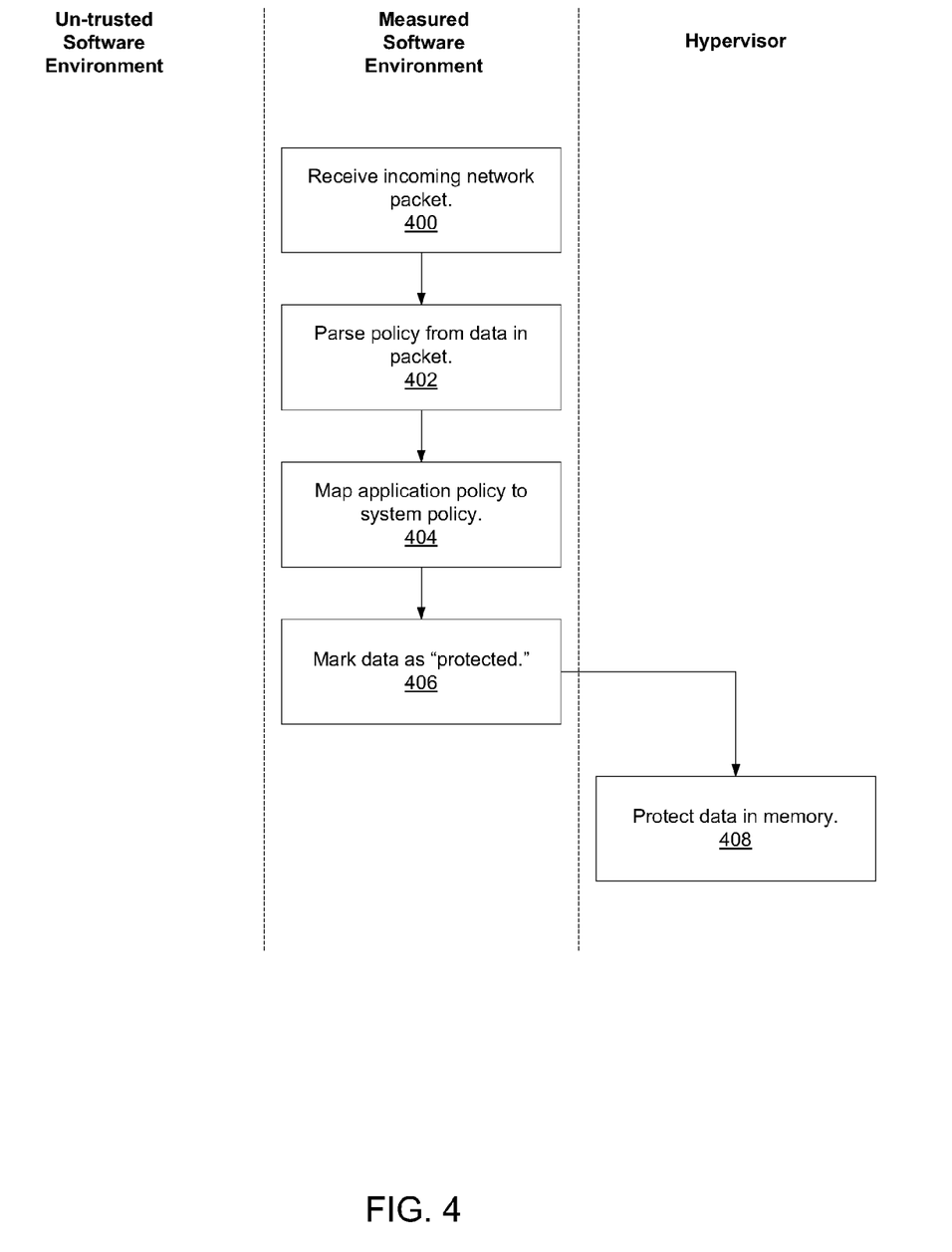
FIG. 4 illustrates a flow diagram of an embodiment of a process to convert and map incoming data protection policies.

FIG. 4 illustrates a flow diagram of an embodiment of a process to convert and map incoming data protection policies.

The measured software environment receives an incoming packet from the network (processing block 400). In many embodiments, this packet includes data as well as a tag attached to the data. The tag specifies the remote policy for data protection of the sending entity. The sending entity may be another computer system on the network or another virtual machine on the same computer system. The network packet is parsed, which splits the tag from the data in the packet (processing block 402). The parsed tag is then analyzed by the measured software environment to determine the protection policy the tag is utilizing. The application policy received from the data packet is then mapped (i.e., converted) to a local system security policy capable of being implemented by the hypervisor (processing block 404).

In some embodiments, the policy must be converted to be utilized by the local hypervisor. In other embodiments, the policy may be a uniform policy utilized by all computer systems on the network, and therefore the conversion is a direct mapping. The data and security policy tag information that was parsed is then pushed through the measured software environment to hypervisor. This allows the security policy to be implemented and the data stored into the memory prior to the data or security policy reaching an un-trusted software environment on the local machine. The measured software specifies the storage location of the data and requests that the tags associated with the data are marked as protected (processing block 406). Additionally, the tag information containing the policy is pushed The measured software environment then sends the mapped security policy and the protected data locations to the hypervisor for implementing the protection procedure. Once the memory tracking module in the hypervisor receives the system policy and the location of the data, it sends instructions to the memory protection/management module to actually enforce the protection scheme in memory (processing block 408).

Figure 5:
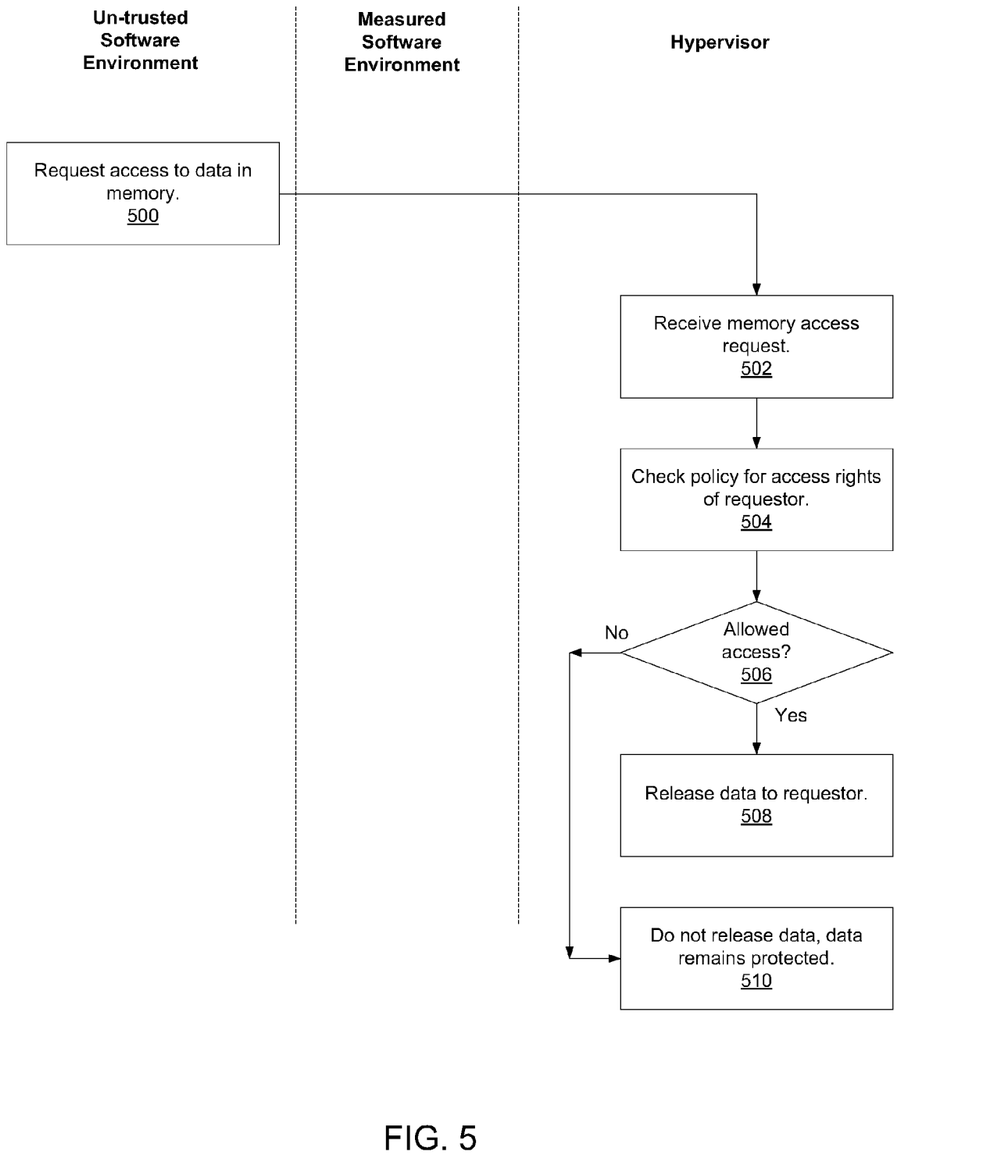
FIG. 5 illustrates a flow diagram of an embodiment of a process to enforce the data security policy on the local machine.

FIG. 5 illustrates a flow diagram of an embodiment of a process to enforce the data security policy on the local machine.

In many embodiments, a data consumer from an un-trusted software environment in the local computer system requests access to data in memory (processing block 500). The access request is received by the hypervisor (processing block 502) and the hypervisor then checks the security policy for the requests data to determine the access rights of the requestor (processing block 504). The check may be performed by logic in both the memory protection/management module and the memory tracking module (218 and 214 in FIG. 2, respectively). For example, the memory protection module may be monitoring access requests to all of memory and receive this access request. The access request has a requestor and a data location in memory of the target location to be accessed. The memory protection/management module then pulls up the location in the tag database (216 in FIG. 2) that it maintains and gets the tag information for the location in memory.

The requestor and tag security information then is sent to the memory tracking module, which keeps track of the security clearance levels of entities requesting access to data and uses this information to determine whether access to the data is allowed (processing block 506). If the data consumer meets the minimum security clearance level of the data being requested, then access is allowed and the data is released to the requestor (processing block 508). Otherwise, if the minimum security clearance level to access the data is not met, then the data is not released and the data in the one or more memory segments remains protected (processing block 510).

Turning to FIG. 6, this figure illustrates an embodiment of the IFTP logic implemented within hardware in a CPU in the system. The memory tracking module 214, memory protection/management module 218, and the tag database 216 may all be implemented within hardware circuitry in CPU 104. The tag database may be implemented in private secure memory located within the CPU 104 or controlled exclusively by the CPU 104. In other embodiments that are not shown, portions of the IFTP may be implemented in other hardware circuitry external to the CPU 104.

Additionally, other portions of the system as described in FIG. 6 may also be implemented in hardware. For example, though not shown specifically in FIG. 6, the incoming tag verification generation module 210, tag policy conversion module 212, and outgoing tag verification generation module 220 may also be partially or completely implemented in hardware circuitry as well.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

We claim:

1. A method, comprising:
    specifying, by an application residing in an un-trusted source software environment in a local computing device, a data protection policy defined by a first set of security tags to govern access to protected data stored in a first memory page of a plurality of memory pages in the local computing device;
    maintaining a tag database for the plurality of memory pages in the local computing device, the tag database identifying which memory pages of the plurality of memory pages are protected and comprising a plurality of tags, wherein a given tag of the plurality of tags is associated with a given memory page of the plurality of memory pages;
    mapping, by a tag policy conversion module executed in a trusted software environment of the local computing device, the first set of security tags defining the data protection policy specified by the application residing in the un-trusted software environment to a second set of security tags that are different from the first set of security tags and define a separate, enforceable system-level data protection policy managed by an Information Flow Tracking and Protection (IFTP) logic on the local computing device to convert the specified data protection policy to the enforceable system-level data protection policy;
    tagging the first memory page containing the protected data;
    enforcing the specified data protection policy for the first memory page containing the protected data using the IFTP logic and the enforceable system-level data protection policy;
    coupling (i) one or more tags of the plurality of tags associated with the protected data and (ii) the data protection policy to a network packet; and
    transferring the protected data from the local computer system to a remote computer system across a network in the network packet.

2. The method of claim 1, further comprising:
    receiving the network packet from the network at a remote IFTP logic present in the remote computer system;
    the remote IFTP logic decoupling the data protection policy from the network packet; and
    the remote IFTP logic enforcing the data protection policy for the data residing in the network packet on the remote computer system.

3. The method of claim 1, further comprising:
    receiving the network packet from the network at a remote IFTP logic present in the remote computer system;
    the remote IFTP logic associating the one or more tags coupled to the network packet to the data received from the network packet.

4. The method of claim 1, further comprising:
    the application requesting access to the protected data stored in the first memory page;
    the local IFTP logic intercepting the access request;
    the local IFTP logic checking the system-level data protection policy associated with the first memory page; and
    the local IFTP logic determining whether to grant access, for the application, to the first memory page based on the system-level data protection policy.

5. The method of claim 1, wherein the IFTP logic resides in a hypervisor.

6. The method of claim 1, wherein the IFTP logic resides in hardware circuitry on the local computer system.

7. A system, comprising:
    a network;
    a local computer system coupled to the network and including a tag database, for a plurality of memory pages in the local computer system, wherein the tag database identifies which memory pages of the plurality of memory pages are protected and comprises a plurality of tags, and wherein a given tag of the plurality of tags is associated with a given memory page of the plurality of memory pages, wherein the local computer system is to
    specify, by an application residing in an un-trusted source virtual machine in a local computer system, a data protection policy defined by a first set of security tags to govern access to protected data stored in a first memory page of the plurality of memory pages in the local computer system;
    map, by a tag policy conversion module executed in a trusted software environment of the local computer system, the first set of security tags defining the data protection policy specified by the application residing in the un-trusted source virtual machine to a second set of security tags that are different from the first set of security tags and define a separate, enforceable system-level data protection policy managed by a Information Flow Tracking and Protection (IFTP) logic to convert the specified data protection policy to the enforceable system-level data protection policy;
    tag the first memory page containing the protected data;
    enforce the specified data protection policy for the first memory page containing the protected data using the IFTP logic and the enforceable system-level data protection policy;
    couple (i) one or more tags of the plurality of tags associated with the protected data and (ii) the data protection policy to a network packet; and
    transfer the protected data from the local computer system to a remote computer system across a network in the network packet.

8. The system of claim 7, wherein the system further comprises:
    a remote computer system to:
    receive the network packet from the network at a remote IFTP logic present in the remote computer system;
    decouple the data protection policy from the network packet; and enforce the data protection policy for the data residing in the network packet on the remote computer system.

9. The system of claim 7, further comprising:
a remote computer system to:
receive the network packet from the network at a remote IFTP logic present in the remote computer system;
associate the one or more tags coupled to the network packet to the data received from the network packet.

10. The system of claim 7, wherein the local computer system is further operable to:
intercept an access request from the local application to the protected data stored in the first memory page;
check the system-level data protection policy associated with the first memory page; and
determine whether to grant access, for the application, to the first memory page based on the system-level data protection policy.

11. The system of claim 7, wherein the IFTP logic resides in a hypervisor.

12. The system of claim 7, further comprising a central processing unit (CPU), wherein the IFTP logic resides in the CPU.

13. A non-transitory machine-readable storage medium having stored thereon instructions, which if executed by a machine causes the machine to perform a method comprising:
specifying, by an application residing in an un-trusted source virtual machine in a local computer system, a data protection policy defined by a first set of security tags to govern access to protected data stored in a first memory page of a plurality of memory pages in the local computer system;
maintaining a tag database for the plurality of memory pages in the local computer system, the tag database identifying which memory pages of the plurality of memory pages are protected and comprising a plurality of tags, wherein a given tag of the plurality of tags is associated with a given memory page of the plurality of memory pages;
mapping, by a tag policy conversion module executed in a trusted software environment of the local computer system, the first set of security tags defining the data protection policy specified by the application residing in the un-trusted source virtual machine to a second set of security tags that are different from the first set of security tags and define a separate, enforceable system-level data protection policy managed by a Information Flow Tracking and Protection (IFTP) logic to convert the specified data protection policy to the enforceable system-level data protection policy;
tagging the first memory page containing the protected data;
enforcing the specified data protection policy for the first memory page containing the protected data using the IFTP logic and the enforceable system-level data protection policy;
coupling (i) one or more tags of the plurality of tags associated with the protected data and (ii) the data protection policy to a network packet; and
transferring the protected data from the local computer system to a remote computer system across a network in the network packet.

14. The non-transitory machine-readable storage medium of claim 13, wherein the performed method further comprises:
receiving the network packet from the network at a remote IFTP logic present in the remote computer system;
the remote IFTP logic decoupling the data protection policy from the network packet; and
the remote IFTP logic enforcing the data protection policy for the data residing in the network packet on the remote computer system.

15. The non-transitory machine-readable storage medium of claim 13, wherein the performed method further comprises:
receiving the network packet from the network at a remote IFTP logic present in the remote computer system;
the remote IFTP logic associating the one or more tags coupled to the network packet to the data received from the network packet.

16. The non-transitory machine-readable storage medium of claim 13, wherein the performed method further comprises:
the application requesting access to the protected data stored in the first memory page;
the local IFTP logic intercepting the access request;
the local IFTP logic checking the system-level data protection policy associated with the first memory page; and
the local IFTP logic determining whether to grant access, for the application, to the first memory page based on the system-level data protection policy.

* * * * *